June 27, 1961  L. L. CHARLSON  2,989,951
ROTARY FLUID PRESSURE DEVICE
Filed April 29, 1959  4 Sheets-Sheet 1

INVENTOR.
Lynn L. Charlson
BY
Merchant & Merchant
ATTORNEYS

June 27, 1961    L. L. CHARLSON    2,989,951
ROTARY FLUID PRESSURE DEVICE
Filed April 29, 1959    4 Sheets-Sheet 4

INVENTOR.
LYNN L. CHARLSON
BY
*Merchant & Merchant*
ATTORNEYS

United States Patent Office 2,989,951
Patented June 27, 1961

2,989,951
ROTARY FLUID PRESSURE DEVICE
Lynn L. Charlson, Minneapolis, Minn., assignor to Germane Corporation, Minneapolis, Minn., a corporation of Minnesota
Filed Apr. 29, 1959, Ser. No. 809,880
15 Claims. (Cl. 121—70)

This application is a continuation-in-part of my copending United States patent application, Serial No. 722,554, filed March 19, 1958, now abandoned, and entitled "Rotary Fluid Pressure Device."

My present invention relates generally to fluid pressure apparatus, and more particularly to rotary fluid pressure devices such as rotary pumps, fluid pressure operated motors and the like.

An important object of my invention is the provision of a rotary fluid pressure device which will function equal well as a pump to deliver fluid under pressure or as a fluid pressure operated motor to deliver relatively high torque at relatively low speeds of rotation.

Another object of my invention is the provision of a rotary fluid pressure device comprising a casing defining a chamber and a shaft mounted in coaxial relation with said chamber and extending axially outwardly of the casing for rotation of one thereof relative to the other thereof, and a novel combination and arrangement of parts within the chamber, one of which is movable in an orbit within said chamber and operatively coupled to the chamber wall and the shaft whereby rotation on its own axis is checked or controlled during said orbital movement upon relative rotation between said shaft and casing.

In one embodiment of the instant fluid pressure device, I employed cooperating internally and externally toothed members of the type disclosed in United States Patent No. 1,682,563, issued August 28, 1928 to Myron F. Hill, the internally toothed member having a greater number of teeth by at least one than said externally toothed member, one of the members partaking of a hypocycloidal movement with respect to the other one thereof, and having its axis traveling in an orbit about the axis of said other one thereof, the cylindrical wall of the chamber defining internal gear teeth, the member partaking of said orbital movement having external gear teeth of less number than the teeth of said chamber wall and in meshing engagement therewith whereby rotation is imparted to the member during its orbital movement. The cooperating teeth of said members move into and out of intermeshing engagement and are so shaped as to have substantially sealing engagement with each other during said movement whereby to define fluid chambers which expand and contract during said relative movement between the members.

Another object of my invention is the provision of a rotary fluid pressure device comprising a casing defining a chamber, a shaft extending axially through said chamber and journalled in the casing, an externally toothed member on the shaft within said chamber, an internally toothed member, means in the chamber for controlling or checking rotation of the internally toothed member, said externally toothed member having at least one less number of teeth than said internal member and in meshing engagement therewith, the cooperating teeth of said members defining expanding and contracting fluid compartments, and novel means for directing fluid to said compartments during extension thereof and directing fluid away from the contracting ones of said compartments during relative rotation between said casing and shaft.

Still another object of my invention is the provision of a fluid pressure device of the type set forth which is simple and rugged in construction, which is smooth and efficient in operation, and durable in use.

The above, and still further highly important objects and advantages of my invention will become apparent from the following detailed specification, appended claims and attached drawings:

Referring to the drawings, which illustrate the invention, and in which like reference characters indicate like parts.

In the preferred embodiment of the invention illustrated in FIGS. 1–6, a generally cylindrical casing is shown as comprising a generally cylindrical central member 2, a pair of end members 3 and 4, a plate-like member 5 interposed between the end member 3 and the adjacent end of the central member 2, and a similar plate-like member 6 interposed between the end member 4 and the adjacent end of the central casing member 2. The members 3–6 inclusive have aligned axial openings for reception of a shaft 7, the end members 3 and 4 being provided with bearings 8 in which the shaft 7 is journalled for rotation relative to the casing 1 and coaxial with a chamber 9 defined by the central casing member 2 and the plate-like members 5 and 6. The end casing members 3 and 4, and their respective bearings 8 define annular channels 10 in which are mounted sealing rings 11 which snugly encompass the shaft 7 to prevent leakage of fluid outwardly from the interior of the casing 1.

Figures 1, 2, 3:
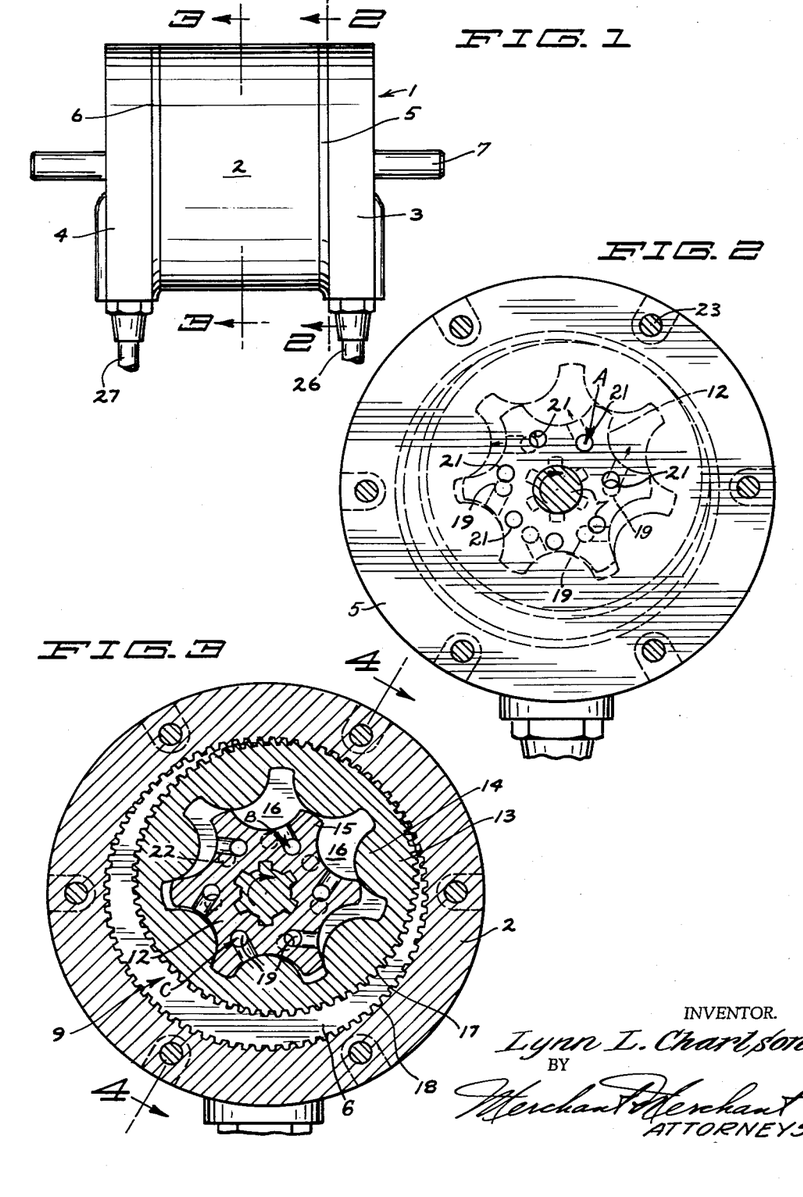
FIG. 1 is a view in side elevation of a preferred form of fluid pressure device made in accordance with my invention.
FIG. 2 is an enlarged transverse section taken on the line 2—2 of FIG. 1.
FIG. 3 is an enlarged transverse section taken on the line 3—3 of FIG. 1.

Between the plate-like members 5 and 6, the shaft 7 is splined to rigidly receive a correspondingly splined externally toothed member 12 which extends axially for substantially the full axial length of the chamber 9, having only running clearance between its opposite ends and the adjacent plate-like members 5 and 6. As shown in FIGS. 2 and 3, the member 12 is contained within and has meshing engagement with an internally toothed member 13 the internal teeth of which are indicated at 14. The externally toothed member 12 has a lesser number of teeth, indicated at 15, than the teeth 14 of the internally toothed member, said teeth 14 being seven in number, the teeth 15 being six in number. Also as shown, the teeth 14 and 15 have substantially sealing engagement with each other during relative rotation between the members 12 and 13 and define fluid compartments 16 which expand and contract during said relative rotation between the members 12 and 13. The structure and arrangement of the members 12 and 13 is such that the internally toothed member 13 is eccentrically disposed with respect to the externally toothed member 12, and the shaft 7 and the chamber 9. As shown in FIG. 3, the internally toothed member 13 is further provided with external gear teeth 17 which intermesh with internal teeth 18 on the inner cylindrical surface of the central section 2, the teeth 17 being less in number than the teeth 18. Thus, as the member 13 moves in an orbit within the chamber 9, with its axis moving in an orbit about the axis of externally toothed member 12, rotation is imparted to the member 13 about its own axis by engagement of the teeth 17 thereof with the teeth 18 which define the cylindrical wall of the chamber 9.

The externally toothed member 12 is provided with a plurality of circumferentially spaced fluid passages 19 that extend longitudinally therethrough, there being one passage 19 for each tooth 15, each passage 19 being disposed radially inwardly of its respective tooth 15. Each fluid passage 19 communicates with a different one of the compartments 16 through a branch passage 20 each extending from its fluid passage 19 toward one side of its respective tooth 15, the branch passages 20 being disposed intermediate the ends of the member 12. It will be noted that the fluid passages 19 are disposed radially inwardly of the root diameters of the teeth 15, and are adapted to be moved into and out of alignment with a plurality of circumferentially spaced passages 21 in the plate-like member 5 and other circumferentially spaced passages 22 in the plate-like member 6. The passages 21 and 22 are each seven in number and equidistantly spaced apart in their respective plate-like members 5 and 6, the passages 22 being staggered with respect to the passages 21. With reference to FIGS. 2 and 3, it will be seen that, when one end of a given passage 19 is aligned with a cooperating passage 21, as indicated at A in FIG. 2, the opposite end of said given passage 19 is disposed centrally between a pair of passages 22, as indicated at B in FIG. 3. It will be further noted that, when a given passage 19 is aligned with a cooperating passage 21, as indicated at A in FIG. 2, the diametrically opposite passage 19 is aligned with a cooperating passage 22, as indicated at C in FIG. 3.

Figures 4, 5, 6:
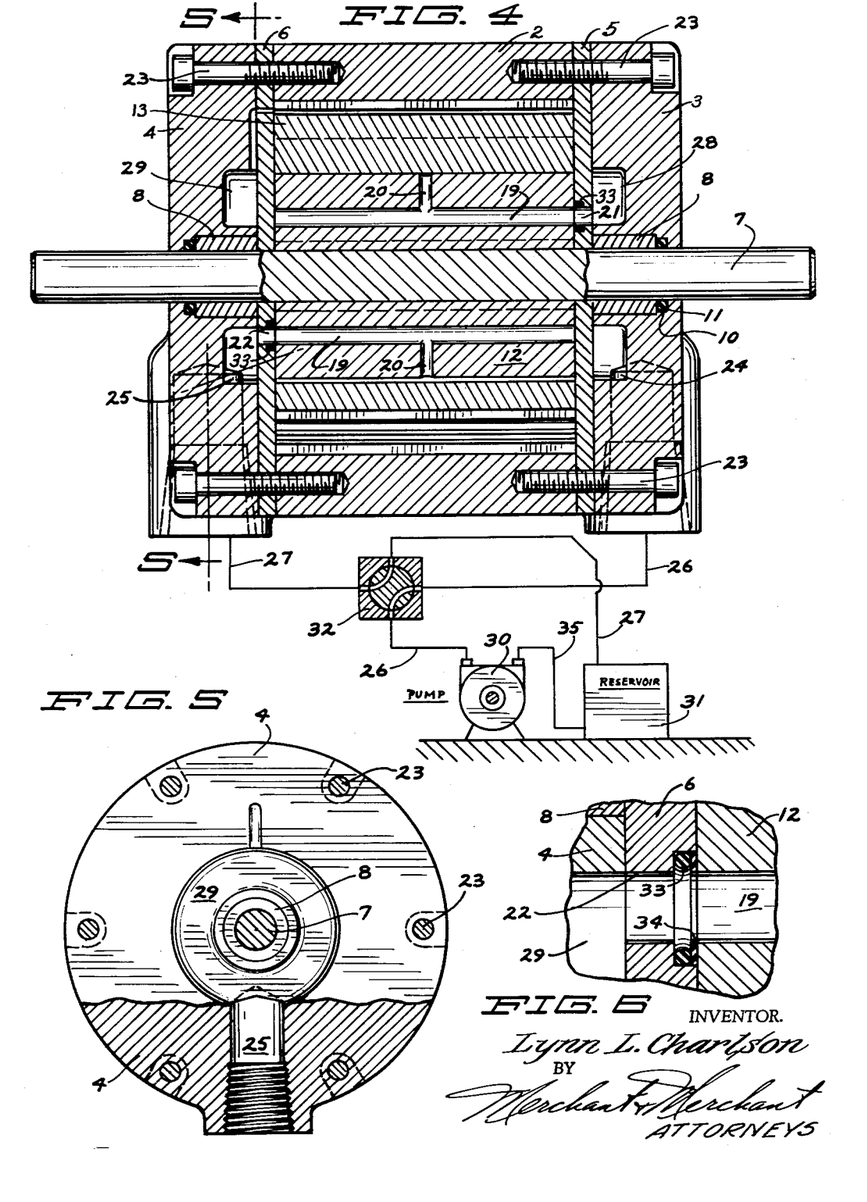
FIG. 4 is an axial section taken substantially on the line 4—4 of FIG. 3 and diagrammatically showing a fluid pressure system.
FIG. 5 is a transverse section taken substantially on the irregular line 5—5 of FIG. 4, on a reduced scale.
FIG. 6 is an enlarged fragmentary detail corresponding to a portion of FIG. 5.
Figure 7:
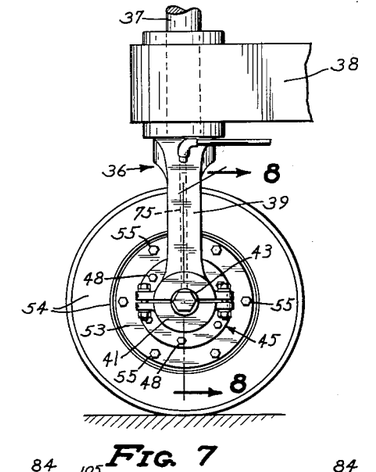
FIG. 7 is a fragmentary view in side elevation of a modified form of the invention incorporated in a fork mounted wheel for use as a vehicle motor.

As shown, the several members of the casing 1 are releasably secured together by machine screws or the like 23 extending inwardly through the end members 3 and 4 and the plate-like members 5 and 6 and screw threaded into opposite ends of the intermediate or central member 2 in circumferentially spaced relationship. In the embodiment of the invention illustrated in FIGS. 1–6, the end members 3 and 4 are provided with ports 24 and 25 respectively which receive the ends of respective fluid conduits 26 and 27. The end members 3 and 4 cooperate with their respective adjacent plate-like members 5 and 6 to define annular passages 28 and 29 respectively, each of which is in communication at all times with all of the passages 21 and 22 in their respective plate-like members 5 and 6. With reference to FIG. 4, it will be seen that the annular passage 28 communicates with the port 24, whereas the annular passage 29 communicates with its respective port 25. For the purpose of the present example, the port 24 may be considered as an inlet port and the port 25 as a discharge port, the conduits 26 and 27 being connected to the delivery side of a pump 30 and a reservoir 31 respectively, through a conventional valve indicated at 32. With reference to FIGS. 4 and 6, it will be seen that the passages 21 and 22 in their respective plate-like members 5 and 6 are counterbored to receive the sealing rings 33 and cooperating washers 34 to prevent leakage of fluid under pressure between the externally toothed member 12 and the plate-like members 5 and 6 from the passages 21 and 22 to the several expanding and contracting compartments 16, or in the opposite direction, when the passages 21 and 22 are out of alignment with the passages 19.

When my novel device is to be utilized as a fluid pressure operated motor, as indicated in FIG. 4, fluid under pressure from the power operated pump 30, which is connected to the fluid reservoir 31 by a conduit 35, enters the port 24 and flows through the passages 21 that are aligned with the passages 19, and from thence into various ones of the compartments 16 causing expansion of said compartments. With the arrangement shown, the externally toothed member 12 will rotate in a clockwise direction, and orbital movement will be imparted to the internally toothed member 13 in a counterclockwise direction, both with respect to FIGS. 2 and 3, the toothed engagement of the member 13 with the central member 2 causing the member 13 to rotate on its own axis in a clockwise direction with respect to FIGS. 2 and 3. Clockwise rotation of the internally toothed member 13 on its own axis is slightly slower than that of the externally toothed member 12 and shaft 7 due to the greater number of internal teeth on the member 13 than the number of internal teeth on the member 12, said teeth being of like pitch. During expansion of each compartment 16, the respective fluid passage 19 communicating therewith moves alternately into and out of registration with a passage 21 in the plate-like member 5, whereby fluid under pump pressure is fed to the expanding compartment to expand the same. When a given compartment 16 is moving through its contracting phase, the passage 19 communicating therewith moves into registration with one of the passages 22 in the plate-like member 6, whereby fluid will flow from the contracting compartment 16 to the discharge port 25. Other passages 19 communicating with expanding compartments 16 are simultaneously at least partly in registration with other passages 21 to receive fluid under pressure from the annular passage 28. Therefore, the fluid is continuously supplied to expanding compartments, the fluid in the contracting compartments moving outwardly through the registered passages 22 into the annular passage 29. The angular direction of the branch passages 20 away from a true radial direction with respect to the externally toothed member 12, coupled with the peculiar numerical relationship between the passages 19 and those of the plate-like members 5 and 6 and the relative locations thereof, and orbital movement of the internally toothed member, all contribute to smooth, even, rotation of the shaft and high torque output. Due to the fact that the internally toothed member 13 completes a total of six orbital cycles for each single revolution of the externally toothed member 12, each compartment 16 is fully expanded during registration of its respective passage 19 with a given passage 21 and fully contracted during registration of its respective passage 19 with a given passage 22.

For heavy duty use, and where extremely high torque is required, the component parts of the device are preferably made from metal such as steel, bronze or the like, the fluid employed being substantially incompressible liquid such as water or oil. As so constructed and with the use of liquid, the shaft 7 can be made to rotate between speeds of less than 1 r.p.m. and more than 600 r.p.m. For light duty use, the various components may be made from lighter weight materials such as aluminum or alloys thereof, plastics, or a combination of metals and plastics, and the fluid may be in the nature of a gaseous medium, such as air. With such an arrangement, the shaft 7 may be made to rotate up to a maximum speed of 1800 r.p.m.

When it is desired to use the instant fluid pressure device as a pump, the conduit 26 is connected directly to a source of fluid, such as the reservoir 31, and the conduit 27 connected to the point at which it is desired to deliver the fluid under pressure. Suitable means, such as a motor or the like, not shown, is coupled to one end of the shaft 7 to rotate the same in the direction indicated by arrows in FIGS. 2 and 3. Upon rotation of the shaft 7, liquid is drawn into the expanding compartments 16 through the passages 19—21 and forced outwardly from the compartments 16 as they contract, through the passages 19, 20 and 22 to the annular passage 29, and from thence through the port 25 to the point of delivery.

In the modified form of the invention illustrated in FIGS. 7–10, a more or less conventional wheel mounting stering fork is indicated in its entirety by numeral 36, and includes a shaft 37 that is journalled on a substantially vertical axis in a frame 38, which frame 38 is shown but fragmentarily, and which may be assumed to be a part of a conventional power driven vehicle, such as a tractor, load carrying vehicle, agricultural implement or the like. Inasmuch as the vehicle, or frame 38 thereof, in and of itself, does not comprise the instant invention, further showing and description thereof is omitted, in the interest of brevity.

The fork 36 involves a pair of laterally spaced generally parallel depending legs 39 and 40 that are provided at their lower ends with split heads or the like 41 and 42 respectively which receive opposite ends of a horizontally disposed shaft 43. The opposite end portions of the shaft 43 are keyed or otherwise rigidly locked to the heads 41 and 42 by suitable means, such as keys 44 whereby the shaft 43 is positively locked against rotation with respect to the fork 36. A generally cylindrical casing 45 is journalled on the shaft 43 intermediate the legs 39 and 40, and comprises a casing section 46 and a cover or cap section 47 rigidly but removably secured to the casing section 46 by circumferentially spaced machine screws or the like 48. The sections 46 and 47 are provided with bearing bosses 49 and 50 respectively, and define a cylindrical chamber 51, the inner cylindrical surface of which is formed to provide internal gear teeth 52. The casing section 46 is further formed to provide a radially outwardly projecting circumferential flange 53 which provides a mounting for a pneumatic tire equipped wheel or the like 54 that is releasably mounted thereon by means of nut-equipped bolts 55.

Figure 8:
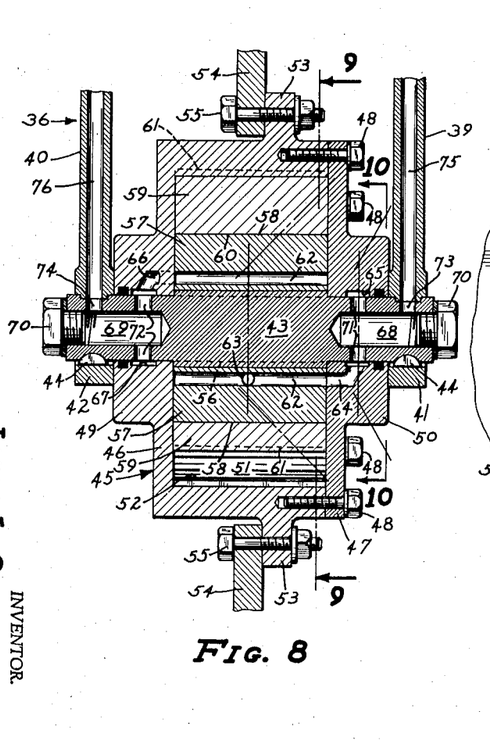
FIG. 8 is an enlarged fragmentary section taken substantially on the line 8—8 of FIG. 7.
Figure 9:
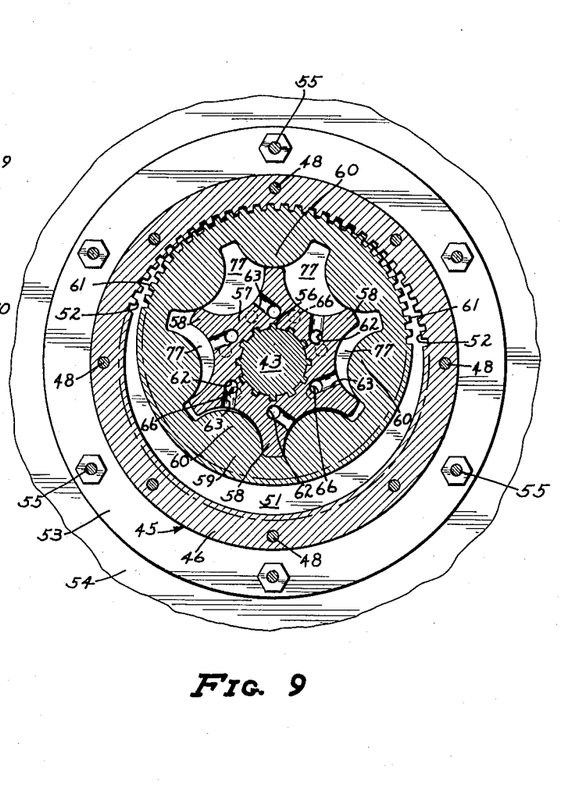
FIG. 9 is a transverse section taken on the line 9—9 of FIG. 8.
Figure 10:
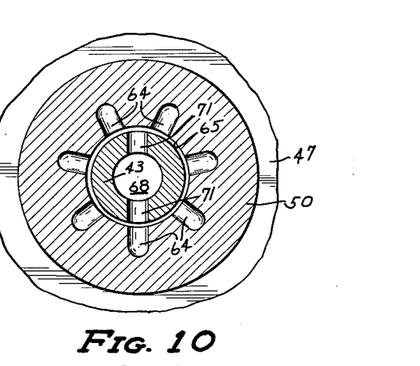
FIG. 10 is a fragmentary section taken on the line 10—10 of FIG. 8.

Shown as being rigidly secured to the shaft 43, by a spline connection 56, is an externally toothed member 57 corresponding generally to the externally toothed member 12. The shaft 43 and externally toothed member 57 are coaxial with the chamber 51, the externally toothed member 57 being provided with a plurality of teeth 58 which, like the teeth 15 of the toothed member 12, are six in number. An annular member 59 corresponds to the internally toothed annular member 13 and is formed to provide internal teeth 60 which, like the teeth 14 are seven in number. Further, like the corresponding member 13, the annular member 59 is provided with external spur teeth 61 for meshing engagement with the teeth 52, the annular member 59 being disposed in the chamber 51 in eccentric relation to the externally toothed member 57.

The externally toothed member 57 is provided with a plurality of axially extending circumferentially spaced fluid passages 62 and branch passages 63 in arrangement identical to the passages 19 and 20 in the externally toothed member 12. The cap section 47 of the casing 45 is formed to provide a plurality of circumferentially spaced fluid inlet passages 64, the inner ends of which are adapted to register with the passages 62 and the outer ends of which communicate with a radially inwardly opening circumferential channel 65 in the bearing box 50. The casing section 46 is likewise provided with a plurality of circumferentially spaced discharge passages 66 which, at their inner ends, are adapted to register with the adjacent ends of the fluid passages 62. At their outer ends, the passages 66 communicate with a radially inwardly opening circumferential channel 67 in the bearing boss 49. Like the passages 21 and 22, the inlet passages 64 and discharge passages 66 are seven in number, the discharge passages 66 being circumferentially staggered with respect to the inlet passages 44 as above described with respect to the structure of FIGS. 1–6.

With reference particularly to FIG. 8, it will be seen that the opposite end portions of the shaft 43 are formed to provide axial recesses or wells 68 and 69 that are closed at their outer ends by cap screws or plugs 70, and which communicate with respective channels 65 and 67 by radial passages 71 and 72 respectively. The shaft 43 is further provided with radial passages 73 and 74 respectively which communicate with their respective wells or recesses 68 and 69 and with respective inlet and discharge passageways 75 and 76 in the legs 39 and 40 respectively of the fork 36. Although not specifically shown, the inlet passageway 75 may be assumed to be connected to a source of fluid under pressure, such as a pump, not shown, the passageway 76 being assumed to be connected to a return line for fluid to the pump.

The structure of FIGS. 7–10 operates in the same manner as does the structure of FIGS. 1–6 when used as a fluid motor, except that the shaft 43 and externally toothed member 57 are stationary, while the casing 45 and wheel 54 carried thereby, rotate when fluid under pressure is introduced to the compartments, indicated at 77, defined by the teeth 58 and 60 of the members 57 and 59 respectively, the compartments 77 successively expanding and contracting in the same manner as the compartments 16 of the structure of FIGS. 1–6. Like the annular member 13, the member 59 partakes of orbital movement in the chamber 51 with the axis of the member 59 moving in an orbit about the common axis of the shaft 43 and externally toothed member 57, rotary movement of the annular member 59 being controlled by intermeshing of the gear teeth 61 with the internal teeth 52 of the casing section 46.

Figure 11:
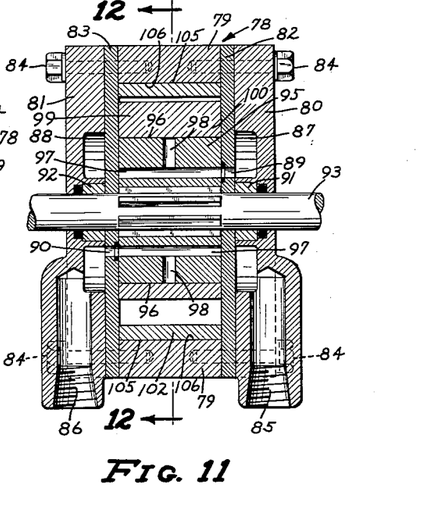
FIG. 11 is an axial section corresponding to FIG. 4 but showing a still further modified form of the invention.
Figure 12:
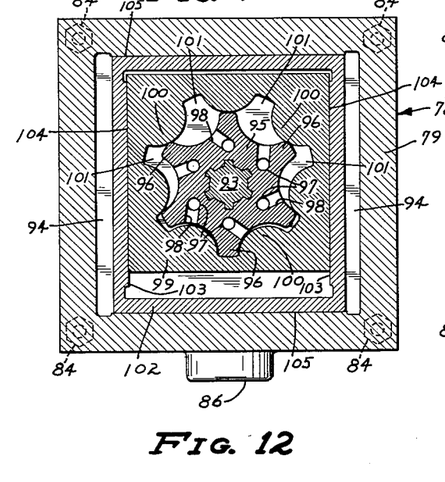
FIG. 12 is a transverse section taken on the line 12—12 of FIG. 11.

In the modification illustrated in FIGS. 11 and 12, a casing 78 is shown as comprising a hollow generally rectangular central casing section 79, a pair of opposed end casing sections 80 and 81 and a pair of plate-like members 82 and 83, the former of which is interposed between the central section 79 and end section 80, and the latter of which is interposed between the central section 79 and the end section 81, see FIG. 11. Except for the exterior shape thereof, the end sections 80 and 81 and plate-like members 82 and 83 are identical to the respective end sections or members 3 and 4 and plate-like members 5 and 6 respectively. As shown, the end sections and plate-like members are rigidly secured to opposite ends of the central section 79 by machine screws or the like 84. Further, as in the structure illustrated in FIG. 1–6, the end sections 80 and 81 are provided with respective ports 85 and 86 and, with their adjacent plate-like members 82 and 83, define annular passages 87 and 88 respectively which communicate with respective ports 85 and 86. The plate-like members 82 and 83 are provided with circumferentially spaced passages 89 and 90 respectively, one each of which is shown in FIG. 11. However, it may be assumed that the passages 89 and 90 are arranged in the same manner as are the passages 21 and 22 in the plate-like members 5 and 6 respectively .

The end sections 80 and 81 are formed to provide central apertures in which are mounted sleeve bearings 91 and 92 that journal a rotary shaft 93 which extends axially through a generally rectangular chamber 94 defined by the hollow central casing section 79 and the plate-like members 82 and 83. With reference to FIG. 11, it will be seen that the shaft 93 also extends through suitable openings in the central portions of said plate-like members 82 and 83.

Splined or otherwise rigidly mounted on the shaft 93, within the chamber 94, is an externally toothed member 95 similar to the externally toothed member 12, and having circumferentially spaced teeth 96 which, like those of the member 12, are six in number. The externally toothed member 95 is further provided with six circumferentially spaced axially extending passages 97 and branch passages 98, the arrangement of which is identical to that of the passages 19 and 20 of the member 12. The passages 97 are adapted to register with the several passages 89 and 90 in the plate-like members 82 and 83 respectively in the same manner that the passages 19 register with their cooperating passages 21 and 22 in the structure illustrated in FIGS. 1–6.

An internally toothed member 99 is shown as being generally rectangular in form, the internal teeth thereof, in number, seven, being indicated at 100. The teeth 96 are adapted to move successively into and out of intermeshing engagement with the teeth 100, and cooperate therewith to define successively expanding and contracting fluid compartments 101 in the manner above described in connection with the other forms of the invention illustrated.

In the forms of the invention illustrated in FIGS. 1–10, rotation of the internally toothed members is controlled or restrained to the extent that some degree of rotation of the internally toothed members 13 and 59 is permitted due to intermeshing engagement of the external teeth thereof with the internal teeth of the casing. In the form of the device illustrated in FIGS. 11 and 12, orbital movement of the internally toothed member 99 is permitted, but rotary movement thereof on its own axis is controlled or restrained to the extent that none exists. Means for holding the internally toothed member 99 against rotary movement on its own axis during orbital movement thereof comprises a generally rectangular cage-like member 102 contained within the chamber 94. The cage-like member 102 defines a pair of laterally spaced parallel flat sides or surfaces 103 which slidably engage adjacent flat sides or surfaces 104 of the internally toothed member 99 to guide said internally toothed member 99 in linear movements in opposite directions transversely of the axis of the shaft 93, or in an up and down movement with respect to FIGS. 11 and 12. The cage-like member 102 is itself mounted in the chamber 94 for sliding movements in opposite directions transversely of the axis of the shaft 93, and normal to the directions of movement of the member 99 relative to the cage-like member 102. The member 102 has top and bottom outer surfaces 105 which slidably engage adjacent inner wall surfaces 106 of the intermediate casing section 79 whereby the cage-like member 102 is guided in its above described linear movement with respect to the casing 78, this movement being in a horizontal direction with respect to FIG. 12. Linear movement of the internally toothed member 99 relative to the cage-like member 102 is simultaneous with the linear movement of the cage-like member 102 relative to the casing 78, so that orbital movement of the internally toothed member 99 is attained while the same is held against rotary movement with respect to the casing 78.

The operating characteristics of the form of the device shown in FIGS. 11 and 12 are somewhat different from those of the form of the device shown in FIGS. 1–6, due to the fact that in one, the orbiting member is held against rotation, while in the other, the orbiting member rotates relatively slowly in the direction of rotation of the shaft. For instance, in utilizing these devices as fluid motors, and assuming that the compartments 16 and 101, at their maximum expanded conditions, are of equal size, when fluid under pressure is introduced to the input ports of both devices at equal pressure, the shaft 7 will rotate at a greater speed than the shaft 93. On the other hand, the torque applied to the shaft 93 is greater than that applied to the shaft 7. When the devices, as set forth, are used as pumps, with the speeds and torque applied to the shaft 7 and 93 being equal, the device of FIGS. 1–6 will deliver fluid in greater volume per revolution of the shaft than the structure of FIGS. 11 and 12, at low pressures. The structure of FIGS. 11 and 12 however, will deliver its lesser amount of fluid at higher pressure than can be obtained with the structure of FIGS. 1–6, with equal torque applied to the shafts thereof.

The fluid pressure device in its various forms as above described, is capable of many varied uses, both as a pump and when utilized as a motor. When used to pump fluid, the device is capable of delivering fairly high volume at relatively high pressures; and, when the same is used as a fluid motor, the same may be driven at low speeds with a higher torque output than has been heretofore obtained in mechanism of this general type.

While I have shown and described a preferred form of my rotary fluid pressure device and two modifications thereof, it will be understood that the same is capable of further modification without departure from the spirit and scope of the invention, as defined in the claims.

What I claim is:

1. In a rotary fluid pressure device, casing means defining a chamber, an internally toothed member in said chamber, a cooperating externally toothed member having at least one less number of teeth than said internally toothed member and disposed radially inwardly of said internally toothed member and eccentric thereto, one of said members having shaft means journalled in said casing means and extending axially outwardly thereof for relative rotation between said shaft means and said casing means, one of said members being movable in an orbit in said chamber and having its axis moving in an orbit about the axis of the other one of said members, the teeth of said members moving successively into and out of intermeshing engagement during orbital movement of the orbiting one of said members and having substantially sealing engagement with each other to define successively expanding and contracting fluid compartments, one of said means defining a fluid inlet and a discharge outlet, one of said members defining passages communicating with said inlet and outlet and different ones of said compartments to direct fluid thereto and deliver fluid therefrom during said relative rotation of said members and orbital movement of the orbiting one of said members, and means engaging the orbiting one of said members to restrain said orbiting member against free rotary movement on its own axis relative to said casing means during orbital movement of said orbiting member.

2. In a rotary fluid pressure device, casing means defining a chamber, an internally toothed member in said chamber, a cooperating externally toothed member having at least one less number of teeth than said internally toothed member and disposed radially inwardly of said internally toothed member and eccentric thereto, said externally toothed member having shaft means journalled in said casing means and extending axially outwardly thereof for relative rotation between said shaft means and said casing means, said internally toothed member being movable in an orbit in said chamber and having its axis moving in an orbit about the axis of said externally toothed member, the teeth of said members moving successively into and out of intermeshing engagement during orbital movement of said internally toothed member and having substantially sealing engagement with each other to define successively expanding and contracting fluid compartments, one of said means defining a fluid inlet and a discharge outlet, said externally toothed member defining passages communicating with said inlet and outlet and different ones of said compartments to direct fluid thereto and to deliver fluid therefrom during said relative rotation of said members and orbital movement of said orbiting internally toothed member, and means engaging said obiting member to restrain said orbiting member against free rotary movement on its own axis relative to said casing means during orbital movement of said orbiting member.

3. In a rotary fluid pressure device, a casing defining a chamber, an internally toothed member in said chamber, a cooperating externally toothed member having at least one less number of teeth than said internally toothed member and disposed radially inwardly of said internally toothed member and eccentric thereto, a rotary shaft fast on said externally toothed member and journalled in said casing, said internally toothed member being movable in an orbit in said chamber and having its axis moving in an orbit about the axis of said externally toothed member and said shaft, the teeth of said members moving successively into and out of intermeshing engagement during orbital movement of said internally toothed member and having substantially sealing engagement with each other to define successively expanding and contracting fluid compartments, said casing defining a fluid inlet and a discharge outlet, said externally toothed member defining passages communicating with said inlet and outlet and different ones of said compartments to direct fluid thereto and deliver fluid therefrom during relative rotation of said members and orbital movement of said internally toothed member, and means engaging the orbiting one of said members to restrain said orbiting member against free rotary movement on its own axis relative to said casing during orbital movement of said orbiting member.

4. In a rotary fluid pressure device, casing means defining a generally cylindrical chamber, an annular internally toothed member in said chamber, a cooperating externally toothed member having at least one less number of teeth than said annular member and disposed radially inwardly of said annular member and eccentric thereto, one of said members being coaxial with said chamber and having shaft means extending axially outwardly of said casing means and mounted for relative rotation betwen said shaft means and said casing means, the teeth of said members moving into and out of intermeshing engagement upon relative rotation between said members and having substantially sealing engagement with each other to define expanding and contracting fluid compartments, one of said means defining a fluid inlet and a discharge outlet, one of said members defining passages communicating with said inlet and outlet and different ones of said compartments to direct fluid thereto and deliver fluid therefrom during said relative rotation of said members, one of said members being eccentric to the cylindrical wall of said chamber, the cylindrical wall of said chamber defining internal gear teeth, said member eccentric to said chamber wall having external teeth of less number than the internal teeth of said chamber wall and in meshing engagement with said internal teeth, whereby orbital movement of said eccentrically disposed member within said chamber will cause rotation to be imparted to the eccentrically disposed member on its own axis and at a different rate than that of the rotating one of said means.

5. In a rotary fluid pressure device, casing means defining a generally cylindrical chamber, an annular internally toothed member in said chamber, a cooperating externally toothed member having at least one less number of teeth than said annular member and disposed radially inwardly of the annular member and eccentric thereto, one of said members being coaxial with said chamber and having a rotary shaft extending axially outwardly of said casing means, the teeth of said members moving into and out of intermeshing engagement upon relative rotation between said members and having substantially sealing engagement with each other to define expanding and contracting fluid compartments, said casing means defining a fluid inlet and a discharge outlet, one of said members defining passages communicating with said inlet and outlet and different ones of said compartments to direct fluid thereto and deliver fluid therefrom during said relative rotation of said members, one of said members being eccentric to the cylindrical wall of said chamber, the cylindrical wall of said chamber defining internal gear teeth, said member eccentric to said chamber wall having external teeth of less number than the internal teeth of said chamber wall and in meshing engagement with said internal teeth, whereby orbital movement of said eccentrically disposed member within said chamber will cause rotation to be imparted to the eccentrically disposed member on its own axis and at a slower rate than that of said coaxial member and shaft.

6. In a rotary fluid pressure device, casing means defining a cylindrical chamber the cylindrical wall of which comprises internal gear teeth, an annular member disposed eccentrically within said chamber and having external gear teeth of less number than said internal teeth and in meshing engagement therewith, said annular member having a given number of internal teeth, a cooperating externally toothed member having at least one less number of teeth than the internal teeth of said annular member and eccentric thereto, said externally toothed member being coaxial with said chamber and having shaft means extending axially outwardly of said casing means and journalled therein for rotation of one of said means relative to the other thereof, the teeth of said members moving into and out of intermeshing engagement upon relative rotation between said members and having substantially sealing engagement with each other to define expanding and contracting fluid compartments during said relative rotation between said members, one of said means defining a fluid inlet and a discharge outlet, said externally toothed member defining fluid passages communicating with said inlet and outlet and with different ones of said compartments to direct fluid thereto and deliver fluid therefrom during said relative rotation of said members, relative rotation between said means imparting orbital movement to said annular member, the toothed engagement of said annular member with said chamber wall causing said annular member to rotate in the same direction as the rotating one of said means and at a different rate than that of said rotating means.

7. In a rotary fluid pressure device, casing means defining a cylindrical chamber, the cylindrical wall of which comprises internal gear teeth, an annular member disposed eccentrically within said chamber and having external gear teeth of less number than said internal teeth and in meshing engagement therewith, said annular member having a given number of internal teeth, a toothed member journalled in said casing means axially of said chamber and having an axial shaft extending outwardly of said casing means and journalled therein, the teeth on said rotor member being at least one less in number than the internal teeth of said annular member and moving into and out of meshing engagement therewith during relative rotation therebetween and in substantially sealing engagement therewith, the internal teeth of said annular member and the teeth of said rotor member cooperating to provide fluid compartments which expand and contract during said relative rotation between said members, said casing means having a fluid inlet and a discharge outlet, said casing means and rotor member defining fluid passages communicating with said inlet and outlet and with different ones of said compartments, rotary movement of said rotor member imparting orbital movement to said annular member, the toothed engagement of said annular member with said chamber wall causing said annular member to rotate in the same direction as said rotor member and at a slower rate than that of said rotor member.

8. In a rotary fluid pressure motor, casing means defining a generally cylindrical chamber, an annular internally toothed member in said chamber, a cooperating externally toothed member having at least one less number of teeth than said annular member and disposed eccentrically within said annular member, the teeth of said members moving into and out of intermeshing engagement upon relative rotation between said members and having substantially sealing engagement with each other to define expanding and contracting fluid compartments, one of said members being coaxial with said chamber and having shaft means extending axially outwardly of said casing means and journalled therein for relative rotation between said shaft means and said casing means, one of said means defining a fluid pressure inlet and a discharge outlet, one of said members having cooperating fluid passages communicating with said inlet and outlet and with different ones of said compartments to admit fluid under pressure to some thereof to cause expansion thereof and impart relative rotation to said members and delivering fluid from the contracting compartments to said outlet, one of said members being eccentric to said chamber, the cylindrical wall of said chamber defining internal gear teeth, said member eccentric to said chamber wall having gear teeth of less number than the internal teeth of said chamber wall and in meshing engagement with said internal teeth of the chamber wall, whereby orbital movement of said eccentrically disposed member within said chamber will cause rotation to be imparted to said eccentrically disposed member on its own axis and at a different rate than that of the rotating one of said means.

9. In a rotary fluid pressure motor, casing means defining a generally cylindrical chamber, an annular internally toothed member in said chamber, a cooperating externally toothed member having at least one less number of teeth than said annular member and disposed radially inwardly of said annular member and eccentric thereto, the teeth of said members moving into and out of intermeshing engagement upon relative rotation between said members and having substantially sealing engagement with each other to define expanding and contracting fluid compartments, one of said members being coaxial with said chamber and having a drive shaft extending outwardly of said casing means, said casing means defining a fluid pressure inlet and a discharge outlet, said casing means and one of said members having cooperating fluid passages communicating with said inlet and outlet and with different ones of said compartments to admit fluid under pressure to some thereof to cause expansion thereof and impart relative rotation to said members and delivering fluid from the contracting compartment to said outlet, one of said members being eccentric to said chamber, the cylindrical wall of said chamber defining internal gear teeth, said member eccentric to said chamber wall having a less number of external gear teeth than the internal teeth of said chamber wall and in meshing engagement with said internal teeth, whereby orbital movement of said eccentrically disposed member within said chamber will cause rotation to be imparted to said eccentrically disposed member on its own axis, and at a slower rate than that of said coaxial member and drive shaft.

10. In a rotary fluid pressure motor, casing means defining a cylindrical chamber the cylindrical wall of which comprises internal gear teeth, an annular member disposed eccentrically within said chamber and having external gear teeth of less number than said internal teeth and in meshing engagement therewith, said annular member having a given number of internal teeth, and a toothed rotor member journalled in said casing means axially of said chamber and having an axial drive shaft extending outwardly of said casing means, the teeth on said rotor member being at least one less in number than the internal teeth of said annular member and moving into and out of meshing engagement therewith during relative rotation therebetween and in substantially sealing engagement therewith, the internal teeth of said annular member and the teeth of said rotor member cooperating to provide fluid compartments which expand and contract during said relative rotation between said members, said casing means having a fluid pressure inlet at one end thereof and a discharge outlet at the other end thereof and defining fluid passages extending from the inlet and outlet to said chamber through adjacent end walls thereof, said rotor member having fluid passages communicating with said compartments and alternately with the passages in opposite ends of said chamber wall during rotation of said rotor member, whereby fluid under pressure is introduced to some of said compartments to expand the same and permitted to be discharged from the contracting compartments through said discharge outlet, rotary movement of said rotor member imparting orbital movement to said annular member, the toothed engagement of said annular member with said chamber wall causing said annular member to rotate in the same direction as said rotor member and at a slower rate than that of said rotor member.

11. The structure defined in claim 10 in which said passages in the rotor member extend axially therethrough in circumferentially spaced relationship, said rotor member passages further including branches extending outwardly toward said compartments at the longitudinally central portion of said rotor member, the passages in one end wall of said chamber being circumferentially staggered with respect to the passages in the opposite end wall of said chamber.

12. In a rotary fluid pressure motor, casing means defining a cylindrical chamber the cylindrical wall of which comprises internal gear teeth, an annular member disposed eccentrically within said chamber and having external gear teeth of less number than said internal teeth and in meshing engagement therewith, said annular member having a given number of internal teeth, and a toothed rotor member journalled in said casing means axially of said chamber and having an axial drive shaft extending outwardly of said casing means, the teeth on said rotor member being at least one less in number than the internal teeth of said annular member and moving into and out of meshing engagement therewith during relative rotation therebetween and in substantially sealing engagement therewith, the internal teeth of said annular member and the teeth of said rotor member cooperating to provide fluid compartments which expand and contract during said relative rotation between said members, said casing means having a fluid inlet at one end portion thereof and a plurality of inlet passages extending from said inlet to said chamber through the adjacent end wall thereof in circumferentially spaced relationship, said casing means at its opposite end having a discharge outlet and a plurality of discharge passages extending from said discharge outlet to the chamber through the adjacent end wall thereof in circumferentially spaced relationship and staggered with respect to the inlet passages, the number of said inlet and discharge passages each being equivalent to the number of internal teeth of said annular member, said rotor member having a plurality of circumferentially spaced fluid passages extending axially therethrough and branches connecting said passages to said compartments intermediate the ends of said rotor member, said rotor passages being equal in number to the teeth of said rotor and moving into and out of registration with said inlet and discharge passages during rotation of said rotor member, rotary movement of said rotor member imparting orbital movement to said annular member, the toothed engagement of said annular member with said chamber wall causing said annular member to rotate in the same direction as said rotor member and at a slower rate than that of said rotor member during said orbital movement of the annular member.

13. In a rotary fluid pressure device, casing means defining a chamber, an internally toothed member in said chamber, a cooperating externally toothed member having at least one less number of teeth than said internally toothed member and disposed radially inwardly of said internally toothed member and eccentric thereto, one of said members having shaft means journalled in said casing means and extending axially outwardly thereof for relative rotation between said shaft means and said casing means, one of said members being movable in an orbit in said chamber and having its axis moving in an orbit about the axis of the other of said members, the teeth of said members moving successively into and out of intermeshing engagement during orbital movement of the orbiting one of said members and having substantially sealing engagement with each other to define successively expanding and contracting fluid compartments, one of said means defining a fluid inlet and a discharge outlet, one of said members defining passages communicating with said inlet and outlet and different ones of said compartments to direct fluid thereto and deliver fluid therefrom during said relative rotation between said means and orbital movement of the orbiting one of said members, and a guide member mounting and guiding the orbiting member for linear movements in opposite directions transversely of the axis of said shaft, said guide member being mounted and guided in said chamber for linear movements in opposite directions normal to said axis and to the direction of linear movement of the orbiting member relative to said guide member, whereby said orbiting member is positively held against rotation on its own axis relative to said casing means during its said orbital movement.

14. In a rotary fluid pressure device, a rotary casing defining a chamber, a stationary shaft extending axially through said chamber and journalling said casing, an internally toothed member in said chamber, a cooperating externally toothed member fast on said shaft radially inwardly of said internally toothed member and eccentric thereto, said externally toothed member having one less number of teeth than said internally toothed member, said internally toothed member being movable in an orbit in said chamber and having its axis moving in an orbit about the axis of said externally toothed member and said shaft, the teeth of said members moving successively into and out of intermeshing engagement during orbital movement of said internally toothed member and having substantially sealing engagement with each other to define successively expanding and contracting fluid compartments, said shaft defining a fluid inlet and a discharge outlet, said externally toothed member defining passages communicating with said inlet and outlet and different ones of said compartments to direct fluid thereto and deliver fluid therefrom during relative rotation of said members and orbital movement of said internally toothed member, and means in said casing engaging the orbiting one of said members to restrain said orbiting member against free rotary movement on its own axis relative to said casing during orbital movement of said orbiting member.

15. In a rotary fluid pressure device, a rotary casing defining a cylindrical chamber, the cylindrical wall of which comprises internal gear teeth, an annular member disposed eccentrically within said chamber and having external gear teeth of less number than said internal teeth and in meshing engagement therewith, said annular member having a given number of internal teeth, a stationary shaft extending axially through said cylindrical chamber and journalling said casing, an externally toothed member fast on said shaft radially inwardly of said internally toothed annular member, said annular member being movable in an orbit in said chamber and having its axis moving in an orbit about the axis of said externally toothed member and said shaft, the internal teeth of said annular member and the teeth of said externally toothed member moving successively into and out of intermeshing engagement during orbital movement of said internally toothed member and having substantially sealing engagement with each other to define successively expanding and contracting fluid compartments, said shaft defining a fluid inlet and a discharge outlet, said externally toothed member defining passages communicating with said inlet and outlet and different ones of said compartments to direct fluid thereto and deliver fluid therefrom during relative rotation of said members and orbital movement of said annular member, the toothed engagement of said annular member with said chamber wall causing said annular member to rotate in the same direction as said casing and at a different rate than that of said casing.

References Cited in the file of this patent

UNITED STATES PATENTS

| | | |
|---|---|---|
| Re. 21,374 | Moineau | Feb. 27, 1940 |
| 211,582 | Nash | Jan. 21, 1879 |
| 1,361,046 | Gollings | Dec. 7, 1920 |
| 1,376,291 | Rolkerr | Apr. 26, 1921 |
| 1,389,189 | Feuerheerd | Aug. 30, 1921 |
| 1,682,563 | Hill | Aug. 28, 1928 |
| 1,892,217 | Moineau | Dec. 27, 1932 |
| 1,968,113 | Weaver | July 31, 1934 |
| 2,132,812 | Wahlmark | Oct. 11, 1938 |
| 2,223,070 | Kleckner | Nov. 26, 1940 |
| 2,527,670 | Allen | Oct. 31, 1950 |
| 2,871,831 | Patin | Feb. 3, 1959 |

FOREIGN PATENTS

| | | |
|---|---|---|
| 7,410 | Great Britain | 1906 |
| 9,359 | Great Britain | 1915 |